US010170015B2

(12) United States Patent
Cardonha et al.

(10) Patent No.: US 10,170,015 B2
(45) Date of Patent: Jan. 1, 2019

(54) EDUCATIONAL MEDIA PLANNING AND DELIVERY FOR IN-CLASS LESSONS WITH LIMITED DURATION

(71) Applicant: International Business Machines Corporation, Armonk, NY (US)

(72) Inventors: Carlos H. Cardonha, Sao Paulo (BR); Rodrigo L. Guimaraes, Sao Paulo (BR); Andrea Britto Mattos Lima, Sao Paulo (BR); Vagner F. de Santana, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 15/049,450

(22) Filed: Feb. 22, 2016

(65) Prior Publication Data

US 2017/0243501 A1    Aug. 24, 2017

(51) Int. Cl.
*G09B 7/04* (2006.01)

(52) U.S. Cl.
CPC ..................... *G09B 7/04* (2013.01)

(58) Field of Classification Search
None
See application file for complete search history.

(56) References Cited

U.S. PATENT DOCUMENTS

| 5,904,485 | A | 5/1999 | Siefert |
| 6,160,987 | A | 12/2000 | Ho et al. |
| 6,606,480 | B1 | 8/2003 | L'Allier et al. |
| 7,052,277 | B2 | 5/2006 | Kellman |
| 8,639,177 | B2 | 1/2014 | Hines et al. |
| 8,887,047 | B2 | 11/2014 | Digiantomasso et al. |
| 9,098,407 | B2 | 8/2015 | Cho et al. |
| 2004/0131999 | A1 | 7/2004 | Dresnick |
| 2006/0008788 | A1 | 1/2006 | Dorsett et al. |
| 2007/0099161 | A1 | 5/2007 | Krebs et al. |
| 2008/0261194 | A1 | 10/2008 | Hilton |
| 2011/0117534 | A1* | 5/2011 | Berger ................. G09B 7/02 434/350 |
| 2012/0070808 | A1 | 3/2012 | Fulkerson et al. |

(Continued)

FOREIGN PATENT DOCUMENTS

| WO | 0237447 A2 | 5/2002 |
| WO | 2007117456 A2 | 10/2007 |

(Continued)

*Primary Examiner* — Paul A D'Agostino
(74) *Attorney, Agent, or Firm* — Cantor Colburn LLP; David Quinn

(57) ABSTRACT

An aspect of the disclosure includes a method, a system and a computer program product for planning and presenting a topic to a plurality of students. The method includes defining a topic for a plurality of students and a time period for presenting the topic to the plurality of students. Each of the students has an associated learning style, the learning style including a learning style, pace, speed or mastery information. At least one electronic media is determined from a plurality of electronic media on the topic for each of the students based on a consumption time of the electronic media, the time period and the associated learning style parameter of each student. The at least one electronic media determined for each student is presented to each student.

15 Claims, 4 Drawing Sheets

(56) References Cited

U.S. PATENT DOCUMENTS

| | | | |
|---|---|---|---|
| 2014/0193784 A1* | 7/2014 | Selen | G09B 19/02 434/187 |
| 2014/0308645 A1* | 10/2014 | Chaniotakis | G09B 7/077 434/350 |
| 2014/0335497 A1* | 11/2014 | Gal | G09B 7/00 434/323 |
| 2015/0206441 A1 | 7/2015 | Brown | |
| 2016/0035237 A1 | 2/2016 | Nealon et al. | |

FOREIGN PATENT DOCUMENTS

| | | |
|---|---|---|
| WO | 2008096902 A1 | 8/2008 |
| WO | 2014092537 A1 | 6/2014 |
| WO | 2015009137 A1 | 1/2015 |

\* cited by examiner

EDUCATIONAL MEDIA PLANNING AND DELIVERY FOR IN-CLASS LESSONS WITH LIMITED DURATION

BACKGROUND

The present invention relates generally to a system and method for planning and delivering educational materials, and in particular, to a system and method of planning and delivering educational electronic media on a topic based on student profiles.

Educational classroom sessions are typically planned by a teacher or an educator based on the topic to be presented. Traditionally, the teacher would rely upon textbook materials used by the class in combination with supplementary materials based on the teacher's experience. As paper textbook materials have been increasingly replaced by electronic media, the number and types of media available for presenting a topic to students has expanded. While the larger number of electronic materials provides additional content to help the teacher in explaining the topic, it also may become more time consuming for the teacher to plan the session.

SUMMARY

Embodiments include a method, system, and computer program product for planning and presenting a topic to a plurality of students. The method comprising defining a topic for a plurality of students and a time period for presenting the topic to the plurality of students, each of the students in the plurality of students having an associated learning style parameter, the learning style parameter including a learning style information, learning pace information or speed or mastery information. At least one electronic media is determined by a computing device from a plurality of electronic media on the topic for each of the students in the plurality of students, the determination of the at least one electronic media being based on a consumption time of the electronic media, the time period and the associated learning style parameter of each student, the duration of the electronic media being less than the time period. The at least one electronic media determined for each student is presented to each student in the plurality of students.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
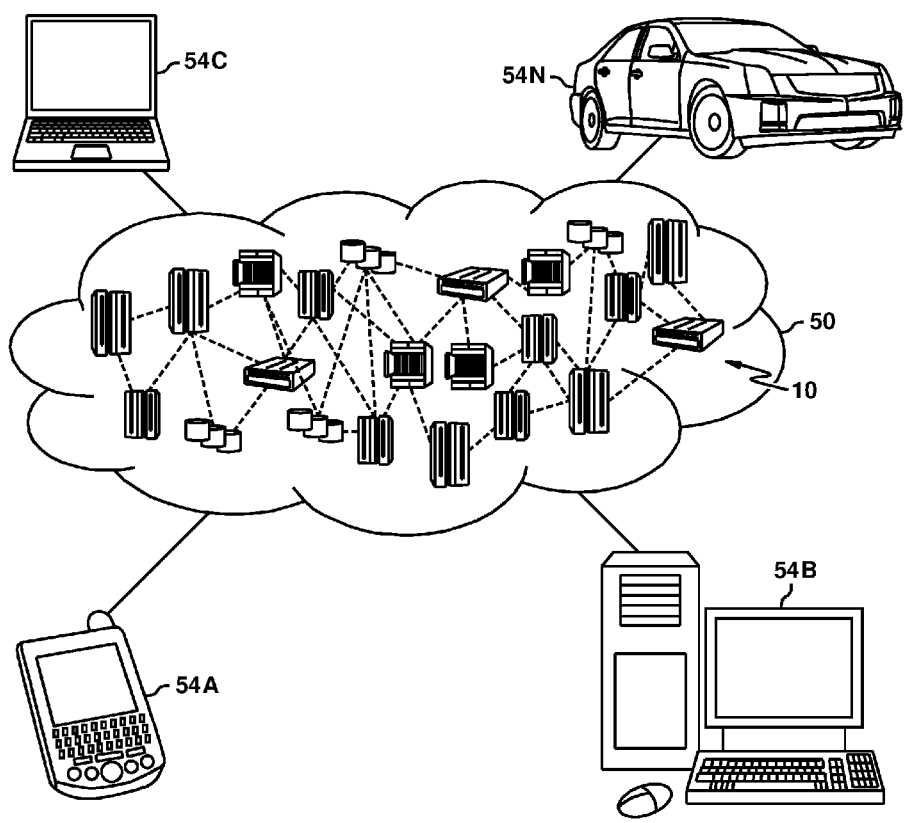
FIG. 1 depicts a cloud computing environment according to an embodiment.

Embodiments of the present disclosure provide for a system and method for planning and presenting a topic to a plurality of students. Embodiments provide for creating a lesson plan for a topic from a library of electronic media based on a student's learning style parameter and the time duration of the learning session. Still other embodiments provide for a review of the students' progress during the learning session and the modification of the lesson plan based on the rate of progress or on assessments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
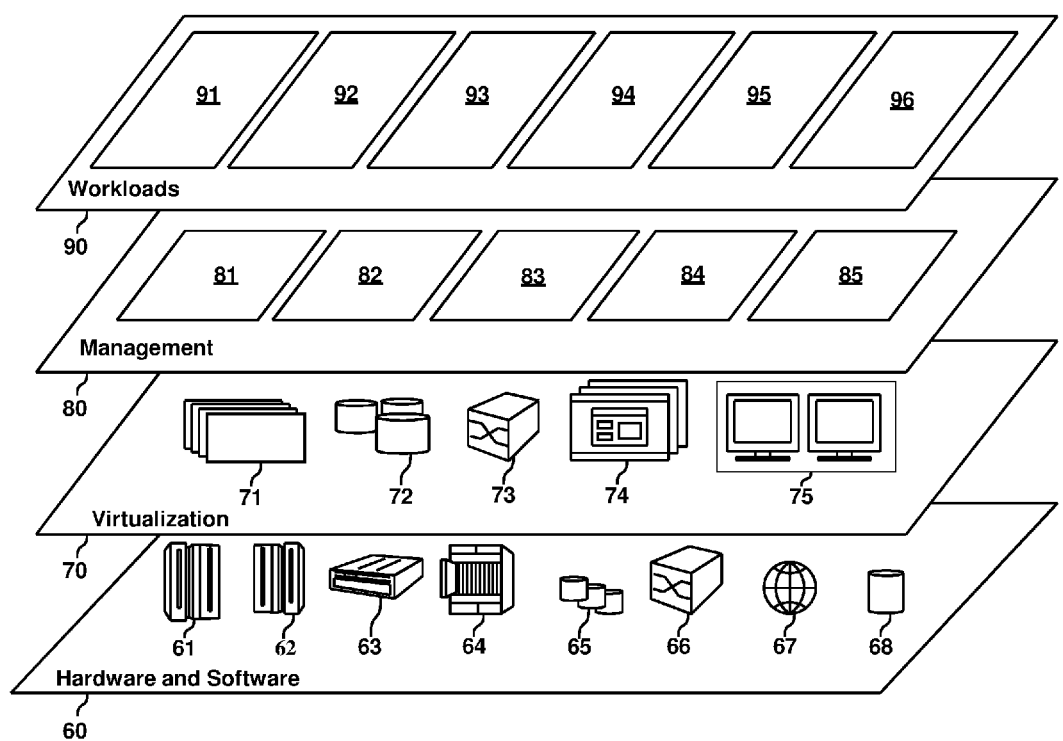
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education system 93; data analytics processing 94; transaction processing 95; and an educational media planning and delivery system 96. The autonomous vehicle schedule processing 96 may perform one or more methods that allow for the picking up or dropping off of passengers at a facility having multiple egresses, such as but not limited to the methods described in reference to FIGS. 3-7 for example.

Figure 3:
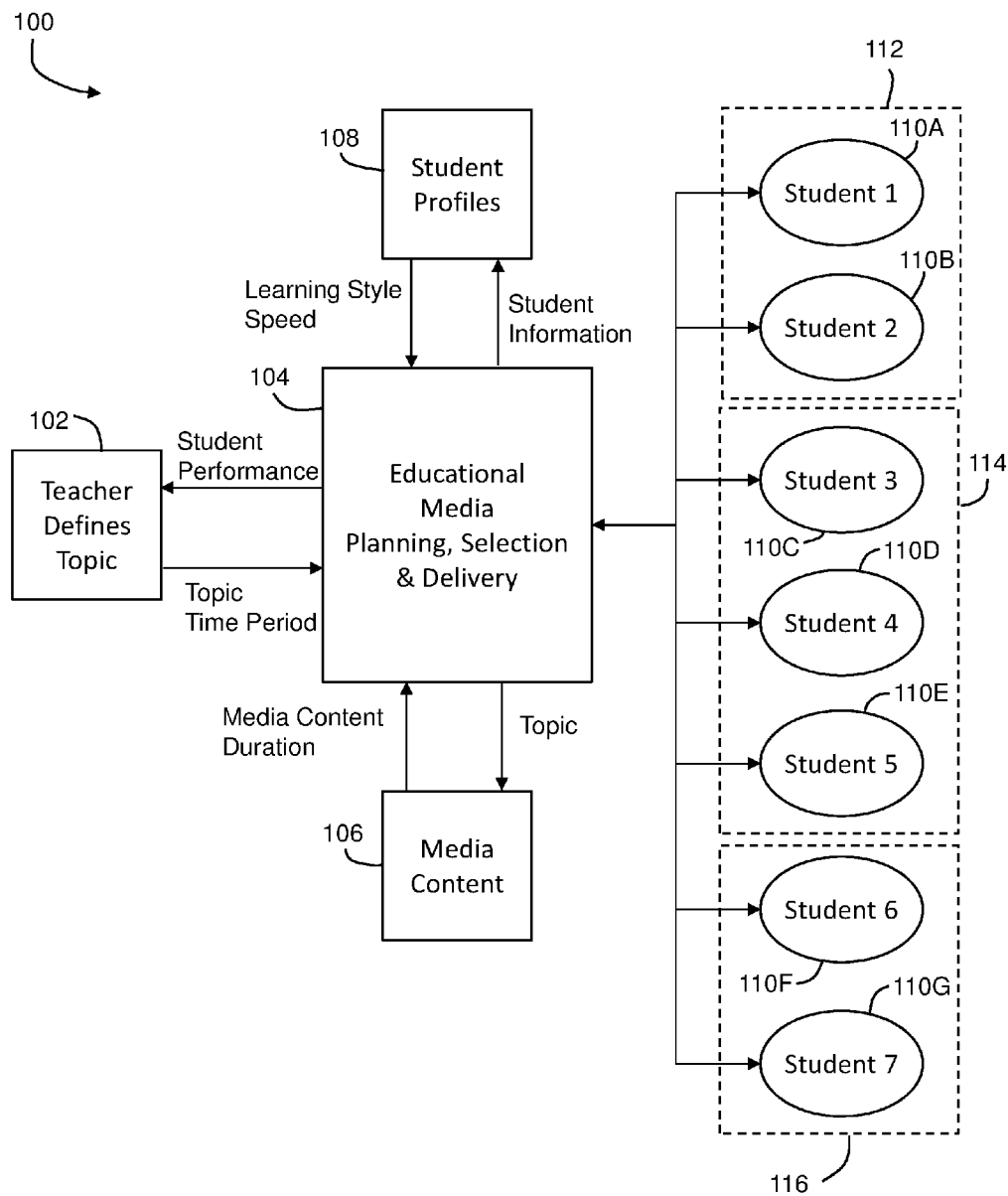
FIG. 3 depicts a data flow diagram of an educational material delivery system in accordance with some embodiments.

Referring now to FIG. 3, an embodiment is shown of an educational planning and delivery system 100. The system 100 includes a teacher module 102 where the instructor or educator initiates the planning process. In an embodiment, the educator selects a topic that will be presented to the students and a time period for the session. The topic and time period are transferred to a media planning module 104. As will be discussed in more detail herein, the media planning module 104 queries libraries of educational media content and selects for each student, or each cluster of students, electronic media that is appropriate for the students to allow them to gain proficiency in the topic. It should be appreciated that each media content has an associated time for consumption by the student. For dynamic media, such as video or audio for example, the consumption time is the length of the dynamic media. For interactive or static media, such as text or graphic novel media for example, the consumption time may be based on an estimated time for a student to complete the interactive or static media. Further, the consumption time may be adjusted for each student based on the individual student's learning style. For example, a student who is a visual learner may be allotted additional time to complete textual media. The media planning module 104 may further monitor the students' progress during the session and adjust the selected media to allow the student to obtain competency during the session (when they are behind), or avoid having the student finish too early.

The media planning module 104 receives inputs from a media content module 106 and a student profile module 108. The media content module 106 includes databases or libraries of electronic media content. In an embodiment, each of the electronic media content includes metadata with parameters associated with the electronic media content. The metadata parameters include, but are not limited to: topics covered, duration of content, and presentation type (e.g. textual, graphical, video). In an embodiment, the metadata may further include sample questions that may be used in an assessment. The student profile module 108 includes parameters and information about the students who are in the session, including but not limited to: learning style information (e.g. visual, audio or textual learner), learning pace information, ability level information, and speed of mastery information (e.g. how quickly do they obtain proficiency in a new topic).

Based on inputs from the media content module 106 and the student profile module 108, the media planning module 104 prepares a lesson plan for each student that includes at least one electronic media and a subsequent assessment. The assessment is a quiz or test that seeks an indication on the level of proficiency on the topic covered by the electronic media. In some embodiments, the lesson plan may be comprised of a plurality of electronic media. In some embodiments, the electronic media may be transmitted to the students via the virtual classroom education system 93. As will be discussed in more detail below, the teaching of a topic through multiple electronic media allows the media planning module 104 to adjust the lesson plans during the session to allow each student to be engaged for the time period of the session. In some embodiments, assessments may be arranged between the electronic media to test the student's competence in the topic. Based on the results of the assessments, the lesson plan may be changed to allow: (i) students that are progressing too slowly can catch up with the other students or (ii) students that are progressing too fast can be "delayed" or slowed down so that others may catch up.

In some embodiments, the students 110A-110G may be arranged into clusters 112, 114, 116. These clusters group students who have compatible or similar learning styles together. As used herein, students having compatible or similar learning styles may not have identical learning styles, but are sufficiently similar to utilize the same electronic media for the identified topic. For example, students 110A, 110B may be visual learners, while students 110C, 110D, 110E may be textual learners. By grouping the students 110A-110G into clusters, a single lesson plan may be generated for each cluster 112, 114, 116. In some embodiments, each student 110A-110G within a cluster starts with the same lesson plan and the media planning module 104 monitors the progress of each student (e.g. through the assessments or determining when the student re-visits content that has been presented). When media planning module 104 determines the student is progressing too slowly (e.g. the student may not become proficient during the session), or is progressing too quickly (e.g. the student may finish early and disrupt others), the lesson plan may be changed or altered to be completed within the remaining time available for the lesson.

When the media planning module 104 determines the student is progressing slowly, the lesson plan may be changed to assist the student in achieving proficiency. For example, the media planning module 104 may change the electronic media remaining in the lesson plan to different electronic media (e.g. shorter in duration or that reinforce missing competencies). The media planning module 104 may also change the remaining electronic media to other electronic media that are more appropriate for the learning style of the student. In some embodiments, the media planning module 104 may increase the amount of materials in other students lesson plans (e.g. have a longer duration) to provide additional time to the student who is not progressing as fast.

In some embodiments, the media planning module 104 may also change the assessments to increase the amount of time available to the student, such as by reducing the number of questions or changing the assessment type (e.g. graphical vs textual). In some embodiments a student may be provided more time by increasing the size or length of the assessments, such that the tests take longer to solve. In an embodiment, the media planning module 104 targets a lesson plan that results in 90%-100% of the session or class being used by the students to learn the topic.

In some embodiments, the assignment of electronic media to the lesson plan for each student (or to the cluster) may be solved by the media planning module 104 as a multi-knapsack problem, in which the constraints are associated with the time restrictions and the objective function is the student's unoccupied time. In some embodiments where the number of topics in the media content module 106 is small (e.g. less than 20), the selection of electronic media content may solved using brute force methods that resolve all combinations.

Figure 4:
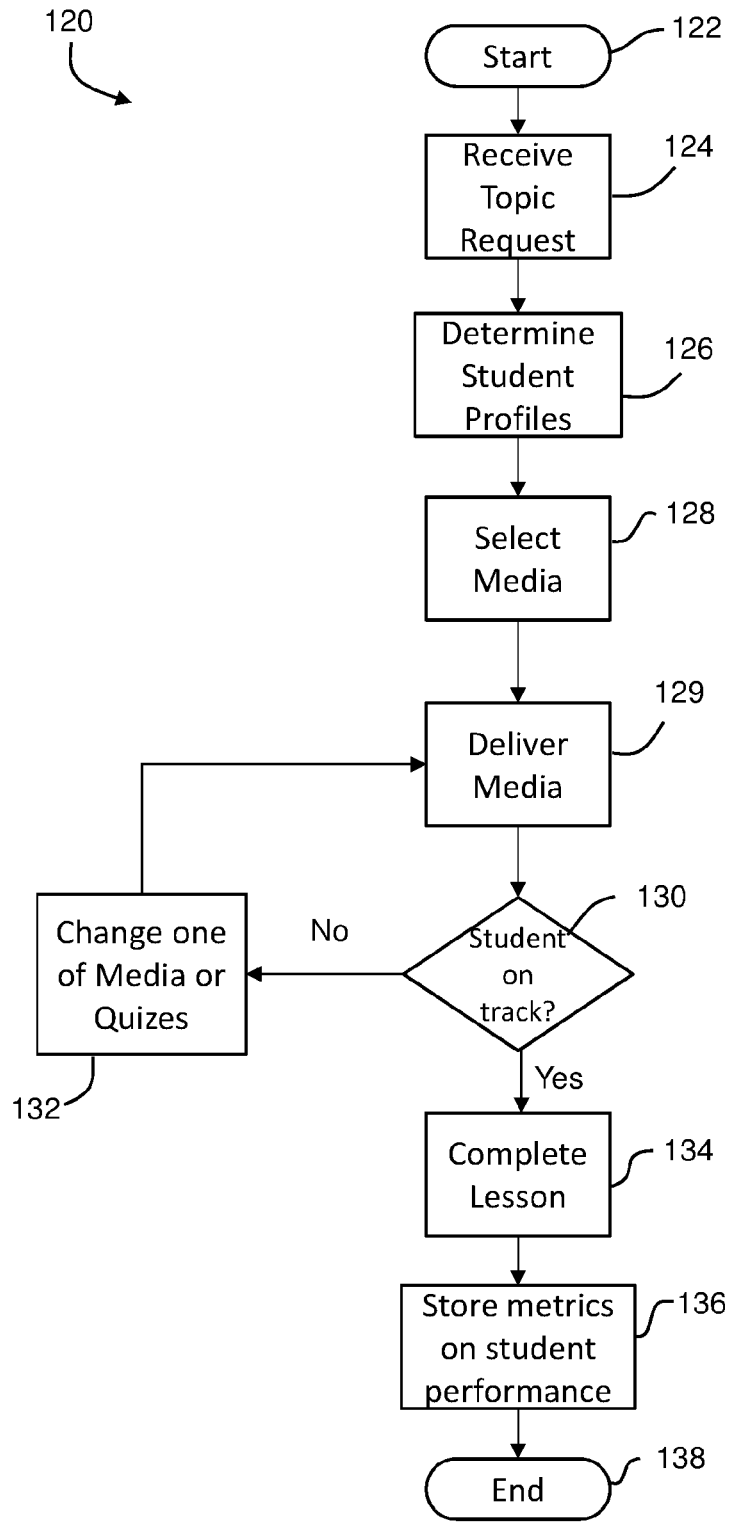
FIG. 4 depicts a flow diagram of a method for delivering educational materials to a group of students in accordance with some embodiments.

Referring now to FIG. 4, a method 120 is shown for planning an educational session using electronic media. The method starts in block 122 and proceeds to block 124 where a topic request is received. The method 120 then proceeds to block 126 where each of the profiles for the students involved in the educational session are determined. The student profiles may include parameters such as the student's learning style for example. These learning styles may include, but are not limited to visual, experiential, auditory, kinesthetic, and read/write learning. In some embodiments, there may be multiple categories of learning styles, such as cognitive, affective and physiological categories. The cognitive style refers to a preferential style in terms of perception, organization and retention. Affective style refers to a motivational dimension of the learning personality. Physiological style refers to bodily states or predispositions for example.

In some embodiments, when the student profiles are received, the method 120 clusters students into groups having similar learning styles.

Next the method 120 proceeds to block 128 where the electronic media for each student is determined. In an embodiment, this determination may be solved as multi-knapsack problem, in which the constraints are associated with the time restrictions and the objective function is the student's unoccupied time. In other embodiments involving smaller numbers of topics, the determination may be made using a brute force methodology where permutations of media content combinations are determined. In some embodiments, a lesson plan is prepared for each student that includes electronic media followed by assessments. Each lesson plan may include multiple electronic media presentations, each followed by an assessment. The electronic media may include textual information, static graphical information, video information and interactive media.

The method 120 then proceeds to block 129 and delivers the electronic media to each of the students. The students may be co-located, meaning in the same classroom or building, or may be geographically dispersed. In an embodiment, the method 120 next proceeds to query block 130 where it is determined if the student is progressing through the lesson plan as anticipated. When the query block 130 returns a negative, meaning the student is either progressing slower or faster than anticipated, the method 120 proceeds to block 132 where the lesson plan may be changed. In block 132, the lesson plan for the student may be changed, or the lesson plans for the other students may be changed. Where a student is progressing slower (e.g. speed of content consumption), or not exhibiting in assessments certain competencies, the remaining electronic media in the lesson plan may be changed to enhance the student's learning. For example, the lesson plan may be changed to select a different set of electronic media for the student (e.g. smaller in size and duration) that reinforces the areas that the student may be struggling. The lesson plan may also be changed to select electronic media having a more appropriate learning style for this student. In still other embodiments, the method 120 may change the lesson plans for the other students, increasing the duration of their electronic media, to provide additional time for the students who are progressing slower.

In further embodiments, the evaluations assigned to the students may be changed. For example, the lesson plan may be changed to provide smaller sets of assessments (to provide additional time for media content consumption). In still further embodiments, the assessments given to other students may be made longer or more difficult (take longer to solve).

It should be appreciated that when a student is progressing faster than anticipated, additional electronic media or longer assessments made be incorporated into the lesson plan so that the student uses between 90%-100% of the time period available for the session. In other embodiments, the lesson plan for the student may be changed to incorporate electronic media that reinforces another topic. The other topic may be chosen based on the student's performance during assessments in previous lessons for example. Once the lesson plans have been adjusted, the method 120 loops back to block 129 and the electronic media and assessments for the revised lesson plan are transmitted to the student.

When the query block 130 returns a positive, the method 120 proceeds to block 134 where the lesson plan is completed. Metrics regarding the student performance may be stored in block 136. In some embodiments, the metrics may be transmitted to the educator. The metrics may include information about how the students performed on their assessments for example. In some embodiments, the metrics may include information on the type of media or learning style that improved comprehension of the topic.

Technical effects and benefits of the embodiments include providing a system and method for planning and presenting a topic to a plurality of students using electronic media that is selected based on a student's learning style and the time duration of the learning session.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
defining a topic for a plurality of students and a time period for presenting the topic to the plurality of students, each of the students in the plurality of students having an associated learning style parameter, the learning style parameter including a learning style information, learning pace information or speed or mastery information;
determining by a computing device a first electronic media from a plurality of electronic media on the topic for each of the students in the plurality of students, the determination of the first electronic media being based on a consumption time of the electronic media, the time period and the associated learning style parameter of each student, the duration of the electronic media being less than the time period;
presenting the first electronic media determined for each student to each student in the plurality of students;
determining a plurality of test questions for each of the first electronic media, and transmitting the plurality of test questions to each of the plurality of students when each student completes the associated first electronic media;
tracking a progress of each student in completing the plurality of test questions during the time period; and changing a number of test questions in the plurality of test questions when the progress of the student indicates the student will not complete the topic within the time period.

2. The method of claim 1 further comprising:
defining at least one cluster of students from the plurality of students, the at least one cluster including students with a compatible learning style parameter; and
wherein the determining the first electronic media includes determining an electronic media item for each of the at least one cluster.

3. The method of claim 1 wherein the plurality of electronic media includes textual media, graphical media, video, and interactive media.

4. The method of claim 1 further comprising:
determining a second electronic media when the progress of the student indicates the student will not complete the topic within the time period, and presenting the second electronic media to the student; and
determining a second electronic media when the progress of the student indicates the student will complete the topic prior to an expiration of the time period, and presenting the second electronic media to the student.

5. The method of claim 1 further comprising determining a second electronic media when the progress of the student indicates the student will complete the topic prior to an expiration of the time period, the second electronic media having a second duration, and presenting the second electronic media to at least a portion of the remaining students.

6. The method of claim 1 further comprising:
reducing the number of test questions in the plurality of test questions when the progress of the student indicates the student will not complete the topic within the time period, and presenting the reduced number of test questions to the student when the first electronic media has been completed; and
increasing the number of test questions in the plurality of test questions when the progress of the student indicates the student will not complete the topic within the time period, and transmitting the increased number of questions to at least a portion of the remaining students.

7. The method of claim 1 wherein the consumption time is an expected consumption time of the electronic media, the expected consumption time being based at least in part on the student's learning style parameter and a media type.

8. A system comprising:
a memory having computer readable instructions; and
one or more processors for executing the computer readable instructions, the computer readable instructions comprising:
defining a topic for a plurality of students and a time period for presenting the topic to the plurality of students, each of the students in the plurality of students having an associated learning style parameter;
determining by a computing device at least one electronic media from a plurality of electronic media on the topic for each of the students in the plurality of students, the determination of the at least one electronic media being based on a consumption time of the electronic media, the time period and the associated learning style parameter of each student, the duration of the electronic media being less than the time period, the learning style parameter including a learning style information, learning pace information or speed or mastery information;
presenting the at least one electronic media determined for each student to each student in the plurality of students;
determining a plurality of test questions for each of the at least one electronic media, and transmitting the plurality of test questions to each of the plurality of students when each student completes the associated at least one electronic media;
tracking a progress of each student in completing the plurality of test questions during the time period; and
changing a number of test questions in the plurality of test questions when the progress of the student indicates the student will not complete the topic within the time period.

9. The system of claim 8 further comprising:
defining at least one cluster of students from the plurality of students, the at least one cluster including students with a compatible learning style parameter; and
wherein the determining at least one electronic media includes determining at least one electronic media for each of the at least one cluster.

10. The system of claim 8 wherein the plurality of electronic media includes textual media, graphical media, video, and interactive media.

11. The system of claim 8 further comprising determining a second electronic media when the progress of the student indicates the student will not complete the topic within the time period, and presenting the second electronic media to the student.

12. The system of claim 8 wherein the consumption time is an expected consumption time of the electronic media, the expected consumption time being based at least in part on the student's learning style parameter and a media type.

13. A computer program product for planning and presenting a topic to a plurality of students, the computer program product comprising a computer readable storage medium having program instructions embodied therewith, the program instructions executable by a processor to cause the processor to perform:
defining a topic for a plurality of students and a time period for presenting the topic to the plurality of students, each of the students in the plurality of students having an associated learning style parameter, the learning style parameter including a learning style information, learning pace information or speed or mastery information;
determining by a computing device a first electronic media from a plurality of electronic media on the topic for each of the students in the plurality of students, the determination of the first electronic media being based on a consumption time of the electronic media, the time period and the associated learning style parameter of each student, the duration of the electronic media being less than the time period; and
presenting the first electronic media determined for each student to each student in the plurality of students;
determining a plurality of test questions for each of the first electronic media, and transmitting the plurality of test questions to each of the plurality of students when each student completes the associated first electronic media;
tracking a progress of each student in completing the plurality of test questions during the time period; and
changing a number of test questions in the plurality of test questions when the progress of the student indicates the student will not complete the topic within the time period.

14. The computer program product of claim 13 further comprising:

defining at least one cluster of students from the plurality of students, the at least one cluster including students with a compatible learning style parameter; and wherein the determining the first electronic media includes determining an electronic media for each of the at least one cluster.

15. The method of claim 1 wherein the time period is determined individually for each student based at least in part on the learning style parameter of the student.

* * * * *